(12) United States Patent
Scott

(10) Patent No.: US 6,435,516 B1
(45) Date of Patent: Aug. 20, 2002

(54) NECK SEAL WITH V-GROOVE SPRING

(75) Inventor: George D. Scott, Cranberry Township, PA (US)

(73) Assignee: Anchor Seals, Inc., Coraopolis ( * ) Notice: Subject to any disclaimer, the term of this patent is extended or adjusted under 35 U.S.C. 154(b) by 3 days.

(21) Appl. No.: 09/710,159

(22) Filed: Nov. 10, 2000

(51) Int. Cl.$^7$ ................................. F16J 15/32
(52) U.S. Cl. .................. 277/553; 277/500; 277/549
(58) Field of Search ................. 277/500, 549, 277/553, 554, 555, 394, 395

(56) References Cited

U.S. PATENT DOCUMENTS

| | | |
|---|---|---|
| 3,330,567 A | 7/1967 | Mercer et al. |
| 3,545,774 A | 12/1970 | Rickley |
| 3,621,952 A | 11/1971 | Long, Jr. |
| 3,692,318 A | 9/1972 | Day et al. |
| 3,827,703 A | 8/1974 | Brink |
| 3,830,508 A | 8/1974 | Endicott |
| 4,022,480 A | 5/1977 | Salter, Jr. |
| 4,116,451 A | 9/1978 | Nixon et al. |
| 4,165,881 A | 8/1979 | Salter |
| 4,234,196 A | 11/1980 | Iida |
| 4,586,720 A | 5/1986 | Simmons et al. |

*Primary Examiner*—Anthony Knight
*Assistant Examiner*—Enoch Peavey
(74) *Attorney, Agent, or Firm*—McKay & Associates, P.C.

(57) ABSTRACT

An improved neck seal having an interior surface being concave throughout and shaped to entirely conform to the circumference of a roll surface of a roll. The concave surface further defines the interior side of an oil-side lip extending upwards from the seal body. A portion of the lips outermost end extends radially downward to form a first stop integral with the lip. A portion of the outermost end of the seal body also extends upward from the top surface thereof to form a second stop integral with the seal body. A v-shaped spring is then disposed in a v-groove defined by the inclined bottom surface of the oil-side lip, and the flat top surface of the seal body. In this manner, the first and second stop retain the spring in a position conducive for a more positive seal contact between the lip of the seal and the roll neck without the use of a garter spring.

1 Claim, 2 Drawing Sheets

NECK SEAL WITH V-GROOVE SPRING

BACKGROUND

1. Field of the Invention

The present invention relates generally to fluid seals, and particularly to neck seals used on rolling mill roll necks which utilize a spring as the means for applying sealing pressure to the roll neck.

2. Description of the Related Art

FIG. 1 illustrates a prior art flexible neck seal 28 of the type described in U.S. Pat. No. 4,165,881 (Salter). It includes a flexible circular seal body 30 having inner surfaces 32a, 32b adapted to be mounted in sealing engagement on the tapered section of a roll neck (not shown). The neck seal 28 is molded of a suitable resilient, rubber-like material. The seal body 30 has an exterior cylindrical surface 38 which is parallel to the rotational axis of the roll (not shown) when the neck is in its mounted position. The seal body is internally reinforced by an embedded combination of a coiled spring 34 and a steel cable 36. A pair of axially spaced circular flexible flanges 40a, 40b is integral with and extend radially outwardly from the seal body at opposite ends of the exterior cylindrical surface 38.

In a wet application, the flanges 40a, 40b of the flexible seal are each provided with circular flexible lips 42, 42b. Each flexible lip is integrally joined to and extends angularly outwardly away from the outer edge 44a, 44b of its respective supporting flange.

FIG. 2 illustrates an improved prior art neck seal as described in U.S. Pat. No. 4,586,720 (Simmons et al.) characterized by a circular shoulder 72 protruding inwardly from the tapered interior surface 74 of the seal body 12. Shoulder 72 is preferably provided with a triangular cross-sectional profile, and its apex 76 is aligned radially with the water-side flange 22. As an improvement, the apex 76 is axially offset by a distance "d" with respect to a reference plane P bisecting the radial outer portion of the flange 22. The offset is on the side of plane P opposite to that occupied by the water-side lip 18.

The water-side flange 22 is provided with a base portion 22a of increased thickness extending from the cylindrical exterior surface 28 of the seal body 12 to approximately the radial midpoint of the flange. The base portion has a truncated right triangular cross-sectional configuration, with the "hypotenuse" side facing the oil-side flange 24.

As a result, a shoulder 72 coacts with the tapered roll neck section (not shown) to produce a circumferential bending moment $M_2$ acting on the seal body 12 in opposition to the circumferential bending moment $M_1$ produced by the radial expansion of the waterside lip 18. Bending moment $M_2$ effectively counteracts bending moment $M_1$, with the result that the water-side flange 22 is maintained in the desired attitude perpendicular to the seal axis, and parallel to the dam (not shown).

The counteracting effect of bending moment $M_2$ is enhanced by the increased flange stiffness at the thickened base portion 22a. The tapered configuration of the base portion 22a avoids damaging frictional contact with the dam.

A secondary benefit provided by shoulder 72 is that it provides an additional sealing line between those afforded by the water-side and oil-side lips 18, 20. This further diminishes the likelihood of fluid seepage (oil or cooling water) between the roll surface and the seal.

Now, referencing both FIGS. 1 and 2, standard in the art of most seal designs is the garter spring 80. Garter springs are generally embedded within the lip body portions of the seal, seen here in the oil-side lip 20 (FIG. 2) or 32b (FIG. 1), in order to augment the radial load provided by the resiliency of the seal lip. In these embodiments, the garter springs 80 are partially molded into the lip configuration. See U.S. Pat. No. 3,330,567 to Mercer et al. for example.

A drawback in the use of a garter spring is evident inasmuch as the garter springs can separate from the remainder of the seal as the interstitial elastomer wears. After a short time, the garter spring 80 thereby breaks through this lip, eliminating the spring seal, and the seal must be changed prematurely. Furthermore, moving or centering the garter spring 80 to be completely molded into the lip would require a difficult lip manufacturing process and would compromise accurate and consistent positioning of the garter spring 80 within the rubber mold, which can lead to variable load characteristics.

There is a need then for an improved neck seal which provides a more positive seal contact between the oil-side lip of the seal and the roll neck without the use of a garter spring.

SUMMARY OF THE INVENTION

The present invention improves on traditional neck seals by providing a metallic v-shaped spring disposed in the v-groove of a neck seal, wherein the v-groove is defined by the bottom surface of the oil-side lip and the top surface of the seal body. Also, the interior surface of the neck seal is concave throughout, whereby the above and other features of the present invention decrease manufacturing time and cost without compromising effectiveness.

An objective of the present invention is to eliminate the need for an embedded garter spring, thereby lessening the chance that the seal needs to be changed prematurely. It is further an objective of the present invention to provide a neck seal that can be easily manufactured, with no embedment of a cable or spring. It is yet another objective of the present invention to provide a seal that provides a more positive contact between the lip of the seal and the roll neck. It is further an objective of the present invention to provide a seal that retains its spring elements away from the rotating neck.

Accordingly, the neck seal is of the type having: a flexible circular seal body; a pair of axially spaced circular flexible flanges integral with and extending radially outwardly from the seal body at opposite ends of an exterior cylindrical surface; and flexible lips integrally joined to and extending angularly outwardly away from the respective flanges.

The improvement generally comprises an interior surface being concave throughout and defining the interior side of an oil-side lip extending upwards from the seal body. A portion of the lips outermost end extends radially downward to form a first stop integral with the lip. A portion of the outermost end of the seal body also extends upward from the top surface thereof to form a second stop integral with the seal body. Furthermore, a v-groove spring is disposed in a v-groove. The v-groove is defined by the inclined bottom surface of the oil-side lip and the flat top surface of the seal body such that the first and second stop retain the spring in a position conducive for a more positive seal contact between the lip of the seal and the roll neck without the use of a garter spring.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated method, and such further applications of the principles of the invention illustrated herein, as would normally occur to persons skilled in the art to which the invention relates.

Figure 1:
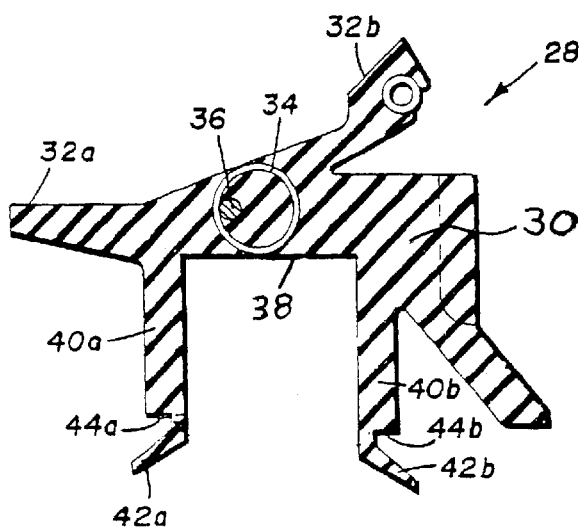
FIG. 1 illustrates a cross-sectional view of a prior art neck seal adapted to be used in a roll neck.
Figure 2:
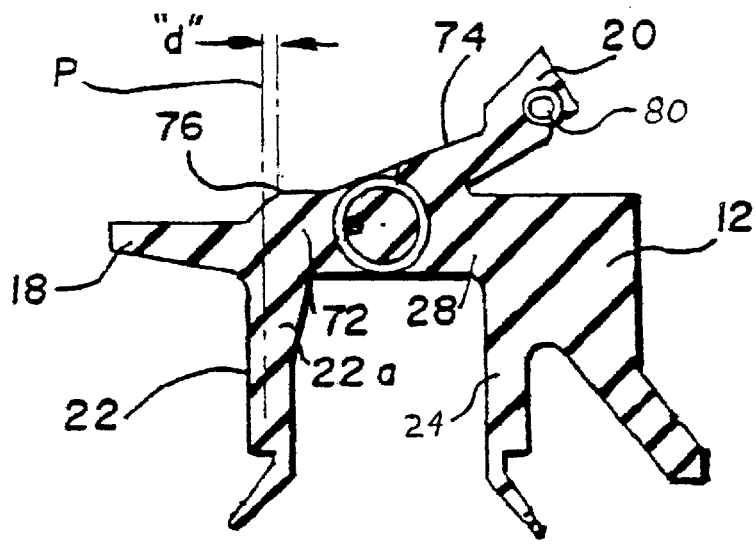
FIG. 2 shows the cross sectional view of a prior art neck seal including a means for counteracting a bending moment.
Figure 3:
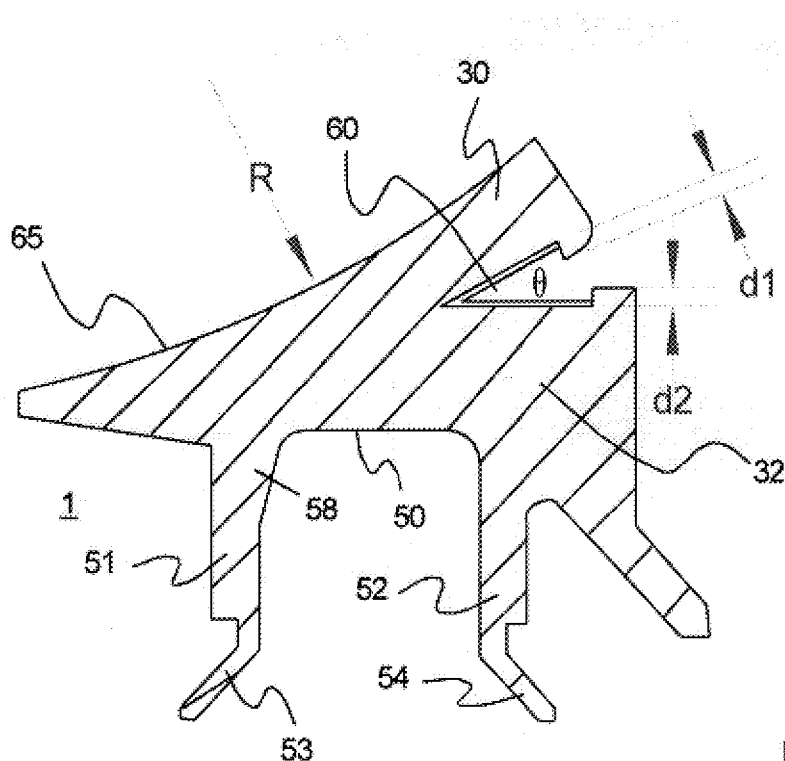
FIG. 3 illustrates a cross-sectional view of the neck seal of the present invention.
Figure 4:
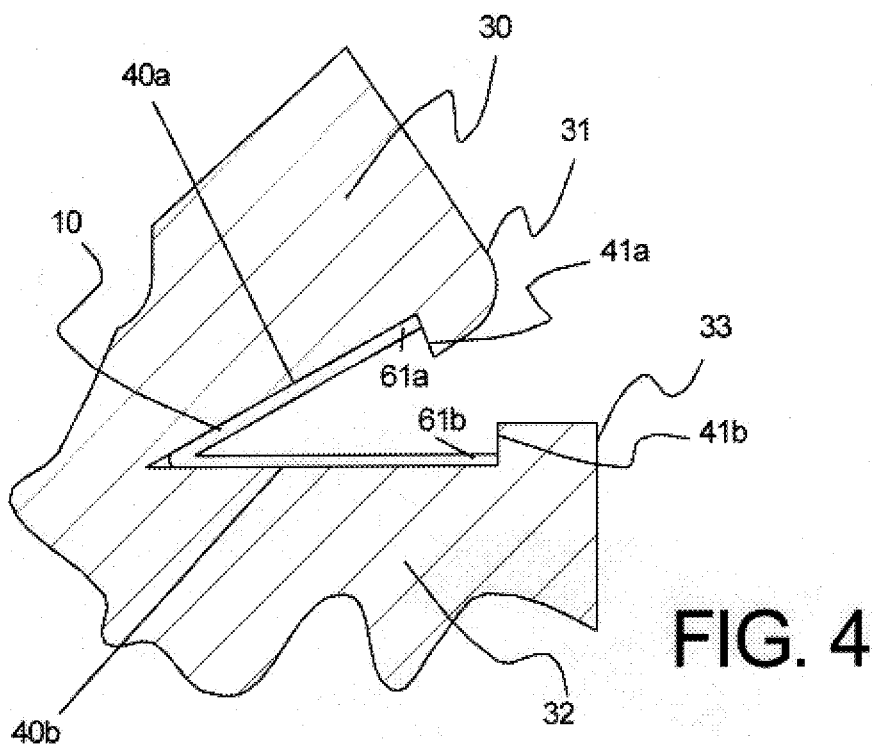
FIG. 4 shows a blow-up portion of the cross-sectional area of the oil-side lip and the rear of seal body as demonstrated in FIG. 3.

The neck seal of the present invention is characterized with reference to FIGS. 3 and 4 in a cross sectional form representing an embodiment of neck seal 1 having a circular seal body 32. The surface on the interior side of neck seal 1 is preferably concave throughout having radius R extending to define the interior surface 65 of oil-side lip 30. This interior surface 65 is the side of the seal that runs against the circumference of the roll itself. The interior surface 65 is preferably concave throughout because it conforms to the roll surface in its entirety.

Oil-side lip 30 extends obliquely upwards from seal body 32 at angle θ. The oil-side lip 30 provides a sealing line to diminish the likelihood of fluid seepage between the roll surface and the seal as is customary in the art. In the present embodiment however, the oil-side lip 30 has a lip outermost end 31 and a portion of lip outermost end 31 extending radially downward a distance $d_1$ from exterior surface 40a, thereby forming a first stop 41a adjacent to the exterior surface 40a of oil-side lip 30.

Seal body 32 has a top surface 40b and a body outermost end 33. A portion of the body outermost end 33 extends radially upward a distance $d_2$ from top surface 40b, thereby forming a second stop 41b adjacent to top surface 40b of seal body 32.

A v-groove 60 in neck seal is then defined by top surface 40b and bottom surface 40a joining to make angle θ whereat oil-side lip 30 joins seal body 32. A v-shaped spring 10, which can be made of a thin metal or a flexible plastic, is adapted to conform to the shape of v-groove 60. The v-shaped spring is situated within v-groove 60 such that a first end 61a of v-shaped spring 10 rests against the first stop 41a, and a second end 61b of v-shaped spring 10 rests against the second stop 41b.

In operation then, v-shaped spring 10 provides an upward force against oil-side lip 30 upon compression and decrease in angle θ resulting from the force exerted on the oil-side lip 30 by the roll neck of the rolling mill when the neck seal 1 is situated on a tapered roll neck section. The v-shaped spring 10 then provides a more positive seal contact between the oil-side lip 30 and the roll neck section, keeping the v-shaped spring 10 itself clear of the rotating neck.

The neck seal 1 also includes the following features mentioned generally since they are common to the known prior art constructions and which perform similar function during operation as known in the art. With reference now to FIG. 3, generally, the seal body 32 has an exterior cylindrical surface 50 which is parallel to the rotational axis of the roll (not shown) when the neck is in its mounted position. A pair of axially spaced circular flexible flanges 51, 52 are integral with and extend radially outward from the seal body at opposite ends of the exterior cylindrical surface 50. The flanges 51, 52 of the flexible seal are each provided with circular flexible lips 53, 54. A circular shoulder 58 protrudes inwardly towards seal body 32 away from flange 51, and each flexible lip is integrally joined to and extends angularly outward away from the outer edges of its respective supporting flange.

I claim:

1. In a neck seal having a flexible, circular seal body with a top surface; a pair of axially spaced circular flexible flanges integral with and extending radially outwardly from said seal body at opposite ends of an exterior cylindrical surface; flexible lips integrally joined to and extending angularly outwardly away from said flanges; the improvement which comprises:

an interior surface, concave throughout, an outermost portion of said concave interior surface defining an interior surface of an oil-side lip, said oil-side lip having an exterior surface extending obliquely upwards from said top surface of said seal body from a point whereat said oil-side lip joins said seal body;

a portion of an outermost end of said exterior surface extending radially downward from said exterior surface to form a first stop integral with said oil-side lip and adjacent to said exterior surface;

a portion of a body outermost end of said seal body extending radially upwards from said top surface to form a second stop integral with said seal body and adjacent to said top surface; and, a v-shaped spring having a first end and a second end, said v-shaped spring disposed in a v-shaped groove defined by said exterior surface of said oil-side lip and said top surface of said seal body such that said first end rests against said first stop and said second end rests against said second stop.

* * * * *